United States Patent [19]

Yi-Shyu

[11] Patent Number: 5,077,317

[45] Date of Patent: Dec. 31, 1991

[54] ELECTRICALLY CONDUCTIVE CLOSED CELL FOAM OF ETHYLENE VINYL ACETATE COPOLYMER AND METHOD OF MAKING

[76] Inventor: Horng Yi-Shyu, 9-1, Lane 161, Hsing An Road Sec. 1, Taichung, Taiwan

[21] Appl. No.: 666,698

[22] Filed: Mar. 8, 1991

[51] Int. Cl.$^5$ .............................................. C08J 9/10
[52] U.S. Cl. ..................................... 521/82; 252/511; 264/45.3; 521/93; 521/97; 521/149
[58] Field of Search .................. 252/511; 264/45.3; 521/149, 82, 93, 97

[56] References Cited

U.S. PATENT DOCUMENTS

| | | | |
|---|---|---|---|
| 4,493,788 | 1/1985 | Fujie et al. | 521/82 |
| 4,525,297 | 6/1985 | Yamane et al. | 521/82 |
| 4,719,039 | 1/1988 | Leonardi | 521/82 |
| 4,800,126 | 1/1989 | Leonardi | 521/82 |
| 4,824,871 | 4/1989 | Shimomura | 521/82 |

*Primary Examiner*—Morton Foelak

[57] ABSTRACT

An EVA closed cell foam is composed of 100 parts of EVA, 1 to 5 parts of azodicarbonamide, 3 to 10 parts of zinc oxide, 1 to 5 parts of zinc stearate, 1 to 3 parts of stearic acid, and 15 to 25 parts of electrically conductive carbon black. The composition is stirred in a stirring machine. The stirred composition is mixed in a mixing machine. The mixed composition is rolled out with a calender roller and sliced to a plurality of sheets. The sheets are cured with a curing machine.

2 Claims, No Drawings

ELECTRICALLY CONDUCTIVE CLOSED CELL FOAM OF ETHYLENE VINYL ACETATE COPOLYMER AND METHOD OF MAKING

BACKGROUND OF THE PRESENT INVENTION

The present invention relates to a closed cell foam of ethylene vinyl acetate copolymer (EVA) and more particularly to an electrically conductive plastic foam of EVA and method of making thereof.

According to the volume resistivity, materials can be classified as electrically conductive materials and insulating materials. The volume resistivity of conductive materials is from 0 to 100K ohm cm. The volume resistivity of insulating materials is no less than 200K ohm cm. Most of conventional plastics are insulators, and very few of plastics are electric conductors. The electric and thermal insulations of plastic foam of EVA are higher than those of conventional plastics. There are two kinds of plastic foams, namely, open cell foam and closed cell foam. It is difficult to manufacture an electrically conductive open cell foam, and it is more difficult to manufacture an electrically conductive closed cell foam such as a closed cell foam of EVA. In general, the volume resistivity of a closed cell foam is higher than that of an open cell foam of the same material. Therefore, it is easier to manufacture an open cell foam of EVA which is electrically conductive. The volume resistivity of the open cell foam of EVA is approximately 100K ohm cm. It is very difficult to manufacture an open cell foam of EVA which has the volume resistivity no more than 50K ohm cm. Therefore, it is more difficult to manufacture a closed cell foam of EVA which has the volume resistivity no more than 50K ohm cm.

SUMMARY OF THE PRESENT INVENTION

The main object of the present invention is to provide a closed cell foam of ethylene vinyl acetate copolymer (EVA) which has excellent electric conductivity with a volume resistivity no more than 50K ohm cm.

Another object of the present invention is to provide a closed cell foam of EVA with light weight, low thermal conductivity, impact resistance, and resistance to mold and fungus.

A further object of the present invention is to provide a method of making a closed cell foam of EVA having the above-described excellent functional features suited for mass-production.

In accordance with a preferred method of the present invention, all the components are stirred together by a stirring machine, mixed by a mixing maching, rolled out by a calender roller, and then pressed by a curing machine. The closed cell foam of EVA has a volume resistivity no more than 50K ohm cm. Therefore, the present invention provides a closed cell foam with excellent electric conductivity, light weight, and impact resistance. With the above-mentioned properties, the electrically conductive closed cell foam of EVA can be applied in many fields.

DESCRIPTION OF THE PREFERRED EMBODIMENT

An electrically conductive closed cell foam of ethylene vinyl acetate copolymer (EVA) is generally composed of an EVA, a blowing agent, a dispersant, a lubricating agent, and a crosslinking agent. These components are stirred together by a stirring machine, mixed by a mixing machine, rolled out by a calender roller, and then pressen by a curing machine. The electrically conductive closed cell foam of EVA possesses the following properties, namely, thermal resistance, impact resistance, water resistance, high resilience, low specific weight, and excellent electric conductivity. The bubbles in the closed cell foam are tiny and even so that the closed cell foam of EVA is an excellent material with the above-mentioned properties. Furthermore, the closed cell foam of EVA has excellent electric conductivity with a volume resistivity no more than 50K ohm cm.

The present invention uses an organic blowing agent such as ADCA (Azodicarbonamide) which produces nitrogen and possesses excellent dispersion property. Thus the nitrogen gas will not damage the plastic foam. The crosslinking agent is an organic peroxide such as DCP (Dicumyl peroxide). The dispersant is the zinc salt of fatty acid such as zinc stearate. The lubricating agent is a fatty acid such as stearic acid. The processing aides are zinc oxide and electrically conductive carbon black.

There are many variable compositions in the present invention. Two preferred embodiments are illustrated as follows.

1. Method of Making an Electrically Conductive Closed Cell Foam of EVA with Volume Resistivity Approximately 50K ohm cm

| Composition of EVA Closed Cell Foam | |
| --- | --- |
| Component | Part by Weight |
| EVA | 100 |
| ADCA | 1 |
| Zinc Oxide | 3 |
| Zinc Stearate | 1 |
| Stearic Acid | 1 |
| Carbon Black | 20 |

The above-identified components are stirrd in a stirring machine for approximately 10 minutes ar room temperature. Then the stirrd composition is mixed in a mixing machine for approximately 8 minutes at a temperature of 100° C. to 110° C. The mixed composition is rolled out with a calender roller at a temperature of 80° C. to 90° C., and the product is subsequently sliced to a plurality of sheets. The sliced sheet is placed in a curing machine at a temperature of 170° C. to 175° C. and a pressure of 150 kg/cm$^2$ for 15 minutes. The EVA closed cell foam is thus formed with a volume resistivity of approximately 50K ohm cm.

2. Method of Making an Electrically Conductive Closed Cell Foam of EVA with Volume Resistivity Approximately 30K ohm cm.

| Composition of EVA Closed Cell Foam | |
| --- | --- |
| Component | Part by Weight |
| EVA | 100 |
| ADCA | 1 |
| Zinc Oxide | 3 |
| Zinc Stearate | 3 |
| Stearic Acid | 1.5 |
| Carbon Black | 25 |

The above-identified components are stirred in a stirring machine for approximately 15 minutes at room temperature. Then the stirred composition is mixed in a mixing machine for approximately 10 minutes at a temperature of 100° C. to 110° C. The mixed composition is rolled out with a calender roller at a temperature of 80° C. to 90° C., and the product is subsequently sliced to a plurality of sheets. The sliced sheet is placed in a curing machine at a temperature of 170° C. to 175° C. and a pressure of 150 kg/cm$^2$ for 15 minutes. The EVA closed cell foam is thus formed with a volume resistivity of approximately 30K ohm cm.

The above preferred embodiments are for illustration only. The scope of the present invention should not be limited to the preferred embodiments. The variation of the preferred embodiments are also covered by the present invention. If the EVA component is maintained 100 parts by weight, the other components can be varied in a certain extent. The ADCA can be varied from 1 to 5 parts by weight. Zinc oxide is varied from 3 to 10 parts by weight. Zinc stearate is varied from 1 to 5 parts by weight. Stearic acid is varied from 1 to 3 parts by weight. The electrically conductive carbon balck is varied from 15 to 25 parts by weight. The components are stirred in a stirring machine for 7 to 15 minutes. The stirred composition is mixed in a mixing machine for 5 to 10 minutes. After the mixed composition is rolled out and sliced, it is placed in a curing machine at a temperature of 165° C. to 180° C. and a pressure of 100 to 200 kg/cm$^2$ for 10 to 30 minutes.

In an environment with low humidity, the MOS (metal oxide semiconductor) and LSI (large scale integration) are easily destroyed or damaged by static electricity. The IC (integrated circuit) of MOS or LSI is easily malfunctioned by the influence of external voltages. Therefore, the EVA closed cell foam can be used for package of IC device in order to protect against electric noise and static electricity. The EVA closed cell foam is used for package of precision components also.

I claim:

1. A method of making an EVA (ETHYLENE VINYL ACETATE COPOLYMER) closed cell foam, said method comprising:
    stirring a composition of 1 to 5 parts of azodicarbonamide by weight, 3 to 10 parts of zinc oxide by weight, 1 to 5 parts of zinc stearate by weight, 1 to 3 parts of stearic acid by weight, and 15 to 25 parts of electrically conductive carbon black by weight together;
    mixing said stirred composition together;
    rolling out said mixed composition with a calender roller;
    slicing said mixed composition to a plurality of sheets;
    curing said sheets with a curing machine.

2. A method of making an EVA (ETHYLENE VINYL ACETATE COPOLYMER) closed cell foam as claimed in claim 1, wherein said method comprises:
    stirring said composition in a stirring machine for 7 to 15 minutes at room temperature;
    mixing said stirred composition in a mixing machine at a temperature of 100° C. to 110° C. for 5 to 10 minutes;
    rolling out said mixed composition with a calender roller at a temperature of 80° C. to 90° C.;
    slicing said mixed composition to a plurality of sheets;
    curing said sheets with a curing machine at a temperature of 165° C. to 180° C. and a pressure of 100 to 200 kg/cm$^2$ for 10 to 30 minutes.

* * * * *